(No Model.)
C. WILLIAMSON.
REVOLVING HARROW.
No. 260,342. Patented June 27, 1882.
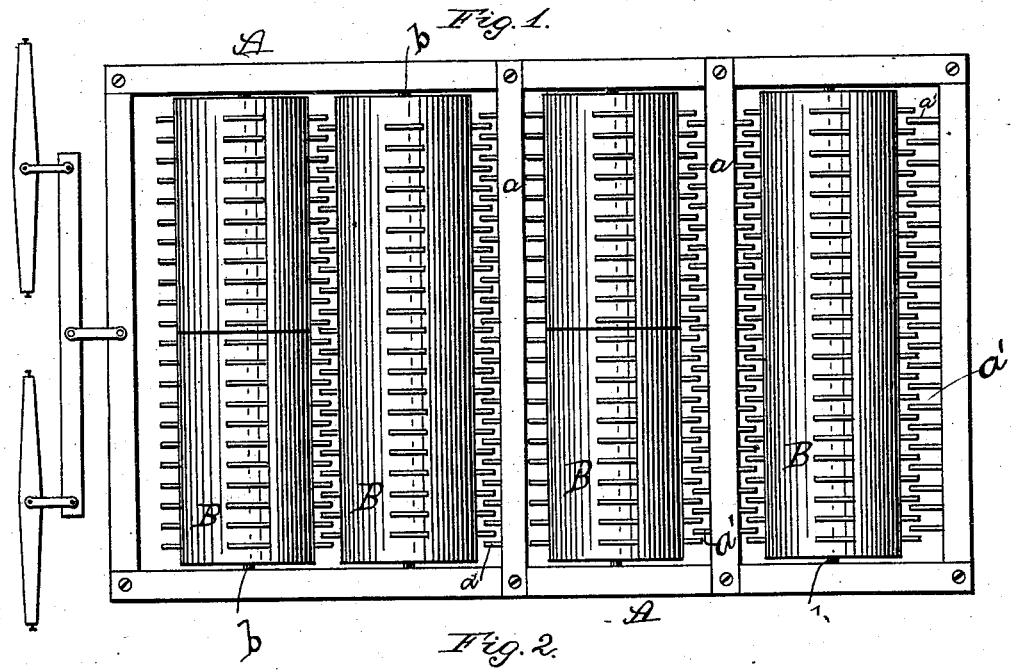
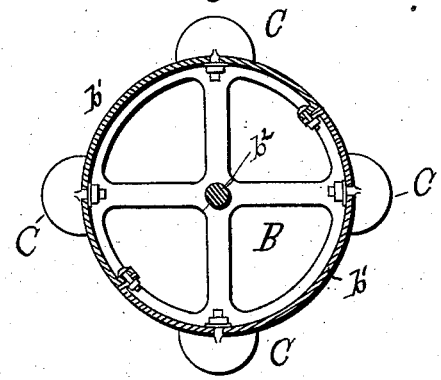
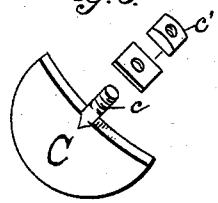
Witnesses:
J. W. Garner
W. J. Osgood
Inventor:
Carper Williamson
Howard A. Munn
his Attorney

UNITED STATES PATENT OFFICE.

CARPER WILLIAMSON, OF FINCASTLE, VIRGINIA.

REVOLVING HARROW.

SPECIFICATION forming part of Letters Patent No. 260,342, dated June 27, 1882.

Application filed April 5, 1882. (No model.)

*To all whom it may concern:*

Be it known that I, CARPER WILLIAMSON, a citizen of the United States, residing at Fincastle, in the county of Botetourt and State of Virginia, have invented certain new and useful Improvements in Revolving Harrows, of which the following is a specification, reference being had therein to the accompanying drawings.

My invention has relation to revolving harrows, the construction and operation of which will be hereinafter fully set forth.

In the drawings, Figure 1 is a top plan view. Fig. 2 is a cross-section of one of the rollers; Fig. 3, a view of one of the teeth, and Fig. 4 a section of the roller.

A is a rectangular frame, within which are journaled the rollers, and across the frame, between the rollers, are bars $a$, as shown. To either end of the frame are attached the whiffletrees.

B represents the rollers. They may extend the entire width of the frame; or two short rollers may be placed upon the same axle, as shown. The rollers are formed of semicircular sections $b'$, the edges of which are turned inwardly, and the sections are bolted together upon the axles $b^2$, journaled in the sides of the frame A, as shown in Figs. 1 and 2. Arranged along the circumference of the cylinder are teeth C. The bases of these teeth conform to the curvature of the roller, and are provided with a stud, $c$, which is put through a hole in the roller and secured by means of the bolt and washer $c'$, as shown. The teeth are arranged with their cutting-edges parallel with the cross section of the roller and the rows parallel with its length, as shown. The bases of the teeth being curved to conform to the surface of the roller, they will be held in their proper position by reason of the fact that any lateral strain tending to twist them out of line will be met and overcome by the outer bearing-surfaces of the teeth, which press against the curved sides of the cylinder. By this arrangement the teeth are held firmly in their proper positions and cannot be twisted out of line. The cutting-edges of the teeth are made in the form of a half-circle, in order that the clods of dirt or turf will be cut to an equal depth the entire travel of the tooth, and thus prevent them from sticking to the teeth.

I am aware that V-shaped teeth have been used upon harrow-cylinders; but there is much annoyance and delay caused by the fact that the point penetrates the clod deepest and transfixes it upon the tooth, thus clogging up the harrow. In my tooth this trouble is obviated, because the tooth cuts the sod an equal depth at all angles from its center, and thus renders it impossible for the sod to become transfixed.

Upon the sides of the bars $a$, next the rollers B, are arranged teeth $a'$, meshing with the teeth C of the roller. The cutting-edges of these teeth are semicircular, and their object is to cut loose clods which may become wedged between the teeth C. I prefer, however, to omit the bars $a$ and to journal the cylinders closely together, so that the teeth of one will mesh with the teeth of the other. This arrangement accomplishes the same result as the bars, and secures economy of construction.

What I claim is—

In a revolving harrow, in combination with the cylinders B, the teeth C, having their cutting-edges made in the form of a half-circle, their bases curved to conform to the sides of said cylinders, and secured thereto by the studs $c$ and nuts $c'$, substantially as shown and described.

In testimony whereof I hereby affix my signature in presence of two witnesses.

CARPER WILLIAMSON.

Witnesses:
W. H. SNOW,
W. J. OSGOOD.